United States Patent [19]
Brodsky et al.

[11] Patent Number: 5,895,472
[45] Date of Patent: Apr. 20, 1999

[54] CHANGE AND ACCOUNTING LOG FOR OBJECT-ORIENTED SYSTEMS

[75] Inventors: Stephen Andrew Brodsky, Los Gatos; Timothy James Grose, Sunnyvale; Rebecca Mei-Har Lau, San Jose, all of Calif.

[73] Assignee: International Business Machines Corporation, Armonk, N.Y.

[21] Appl. No.: 08/850,832

[22] Filed: May 2, 1997

Related U.S. Application Data

[63] Continuation-in-part of application No. 08/747,415, Nov. 12, 1996, application No. 08/747,414, Nov. 12, 1996, application No. 08/747,416, Nov. 12, 1996, application No. 08/747,057, Nov. 12, 1996, application No. 08/747,058, Nov. 12, 1996, and application No. 08/747,417, Nov. 12, 1996.

[51] Int. Cl.$^6$ .................................................. G06F 17/00
[52] U.S. Cl. ........................ 707/203; 707/201; 707/202; 707/103
[58] Field of Search ................... 707/1–206, 500–542; 395/683–712

[56] References Cited

U.S. PATENT DOCUMENTS

| | | | |
|---|---|---|---|
| 5,339,392 | 8/1994 | Risberg et al. | 707/501 |
| 5,701,484 | 12/1997 | Artsy | 395/683 |
| 5,748,896 | 5/1998 | Daly et al. | 395/712 |

Primary Examiner—Matthew M. Kim
Assistant Examiner—David Yiuk Jung
Attorney, Agent, or Firm—Merchant, Gould, Smith, Edell, Welter, & Schmidt

[57] ABSTRACT

A method, apparatus, and article of manufacture for providing a change and accounting log in an object-oriented system. When a function is invoked in an application programming interface (API) to modify one or more aspects of the object-oriented system, a log entry is created in the API that documents various aspects of the invoked function. The log entry identifies the invoked function in the API, input parameters passed to the invoked function in the API, output parameters received from the invoked function in the API, and/or a return code received from the invoked function in the API that indicates a successful and failed completion of the invoked function in the API. Thereafter, the API stores the log entry into the change and accounting log in the data storage device.

19 Claims, 5 Drawing Sheets

```
APIadd Input Parms:
   1      ModelAPIParm::   Data newModel rc 1
   2      ModelAPIParm::   Data APIClass rc 1
   3      ModelAPIParm::   Data Class1 rc 1
APIadd Output Parms:
   1      ModelAPIParm::   Data newModel/Class1 rc 1
```

```
APIadd Input Parms:
   1      ModelAPIParm::   Data newModel/Class1 rc 1
   2      ModelAPIParm::   Data APIAttribute rc 1
   3      ModelAPIParm::   Data a rc 1
APIadd Output Parms:
   1      ModelAPIParm::   Data newModel/Class1/a rc 1
```

```
APIset Input Parms:
   1      ModelAPIParm::   Data newModel/Class1/a rc 1
   2      ModelAPIParm::   Data APIType rc 1
   3      ModelAPIParm::   Data INTEGER rc 1
APIset Output Parms:
   1      ModelAPIParm::   Data newModel/Class1/a rc 1
   2      ModelAPIParm::   Data APIType rc 1
   3      ModelAPIParm::   Data INTEGER rc 1
```

CHANGE AND ACCOUNTING LOG FOR OBJECT-ORIENTED SYSTEMS

CROSS-REFERENCE TO RELATED APPLICATIONS

This application is a continuation-in-part of the following co-pending and commonly-assigned patent applications:

Application Ser. No. 08/747,415, entitled "METHOD FOR SYNCHRONIZING CLASSES, OBJECTS, ATTRIBUTES AND OBJECT PROPERTIES ACROSS AN OBJECT-ORIENTED SYSTEM," filed on Nov. 12, 1996, by Stephen A. Brodsky, et al.;

Application Ser. No. 08/747,414, entitled "LAYOUT METHOD FOR ARC-DOMINATED LABELLED GRAPHS," filed on Nov. 12, 1996, by Dipayan Gangopadhyay, et al.;

Application Ser. No. 08/747,416, entitled "MULTIOBJECT VIEWS IN AN OBJECT MODELING TOOL," filed on Nov. 12, 1996, by Roni Korenshtein;

Application Ser. No. 08/747,057, entitled "INTERACTIVE MODELING AGENT FOR AN OBJECT-ORIENTED SYSTEM," filed on Nov. 12, 1996, by Stephen A. Brodsky, et al.;

Application Ser. No. 08/747,058, entitled "EXECUTION ENGINE IN AN OBJECT MODELING TOOL," filed on Nov. 12, 1996, by Stephen A. Brodsky, et al.;

Application Ser. No. 08/747,417, entitled "NOTIFICATION MANAGER FOR OBJECT-ORIENTED SYSTEMS," filed on Nov. 12, 1996, by Stephen A. Brodsky et al.;

all of which applications are incorporated by reference herein.

This application is also related to the following co-pending and commonly-assigned patent applications:

Application Ser. No. 08/850,829, entitled "METHOD FOR SYNCHRONIZATION BETWEEN LINKS AND GROUP DEFINITIONS WITHIN AN OBJECT-ORIENTED SYSTEM," filed on same date herewith, by Stephen A. Brodsky, et al.;

Application Ser. No. 08/850,858, entitled "OBJECT OUTLINE VIEW FOR GROUPS WITHIN AN OBJECT-ORIENTED SYSTEM," filed on same date herewith, by Stephen A. Brodsky, et al.;

Application Ser. No. 08/850,214, entitled "METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM," filed on same date herewith, Stephen A. Brodsky, et al.;

Application Ser. No. 08/850,838, entitled "MODEL TRACE VIEW FOR OBJECT-ORIENTED SYSTEMS," filed on same date herewith, by Stephen A. Brodsky et al.;

Application Ser. No. 08/850,337, entitled "FRACTAL NESTED LAYOUT FOR HIERARCHICAL SYSTEMS," filed on same date herewith, by Stephen A. Brodsky;

Application Ser. No. 08/850,847, entitled "REFERENCE ATTRIBUTES WITHIN AN OBJECT-ORIENTED SYSTEM," filed on same date herewith, by Stephen A. Brodsky et al.;

all of which applications are incorporated by reference herein.

BACKGROUND OF THE INVENTION

1. Field of the Invention

This invention relates generally to object-oriented systems, and in particular to a change and accounting log for an object-oriented system.

2. Description of Related Art

In object-oriented systems, there is often a need to modify classes, objects, attributes and object properties. However, management of modifications and version control is difficult when multiple users modify the object-oriented system. Users typically make modifications for the purpose of (1) improving the efficiency and/or accuracy of the object-oriented system or (2) debugging the object-oriented system.

Concerning improvements, conscientious users aid in version control by documenting their changes. However, users often forget to record all changes made to the object-oriented system, and instead, may record only the major modifications. Without a complete record of all changes, version control is impossible.

In the case of debugging, the use of trace output from debug statements placed inside the object-oriented system has little application to version control. Instead, trace outputs usually are recorded in an associated log file temporarily and merely to verify the correctness of operation, but not to document modifications.

Current methods for modifying classes, objects, attributes and object properties are not necessarily error-free, and often result in numerous errors throughout the object-oriented system. What is needed, then, is a straightforward method for capturing information concerning changes made to the object-oriented system, so that changes can be undone if necessary. Thus, there is a need in the art for a change and accounting log file that records all changes to a model, including additions, deletions, and modifications. Further, the log file should provide information about the input values used, the functions called, the data created, and who made the change.

SUMMARY OF THE INVENTION

To overcome the limitations in the prior art described above, and to overcome other limitations that will become apparent upon reading and understanding the present specification, the present invention discloses a method, apparatus, and article of manufacture for providing a change and accounting log in an object-oriented system. When a function is invoked in an application programming interface (API) to modify one or more aspects of the object-oriented system, a log entry is created in the API that documents various aspects of the invoked function. The log entry identifies the invoked function in the API, input parameters passed to the invoked function in the API, output parameters received from the invoked function in the API, and/or a return code received from the invoked function in the API that indicates a successful or failed completion of the invoked function in the API. Thereafter, the API stores the log entry into the change and accounting log in the data storage device.

However, for a better understanding of the invention and its advantages, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout:

FIGS. 4A–4C are examples of the contents of a change and accounting log created by the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
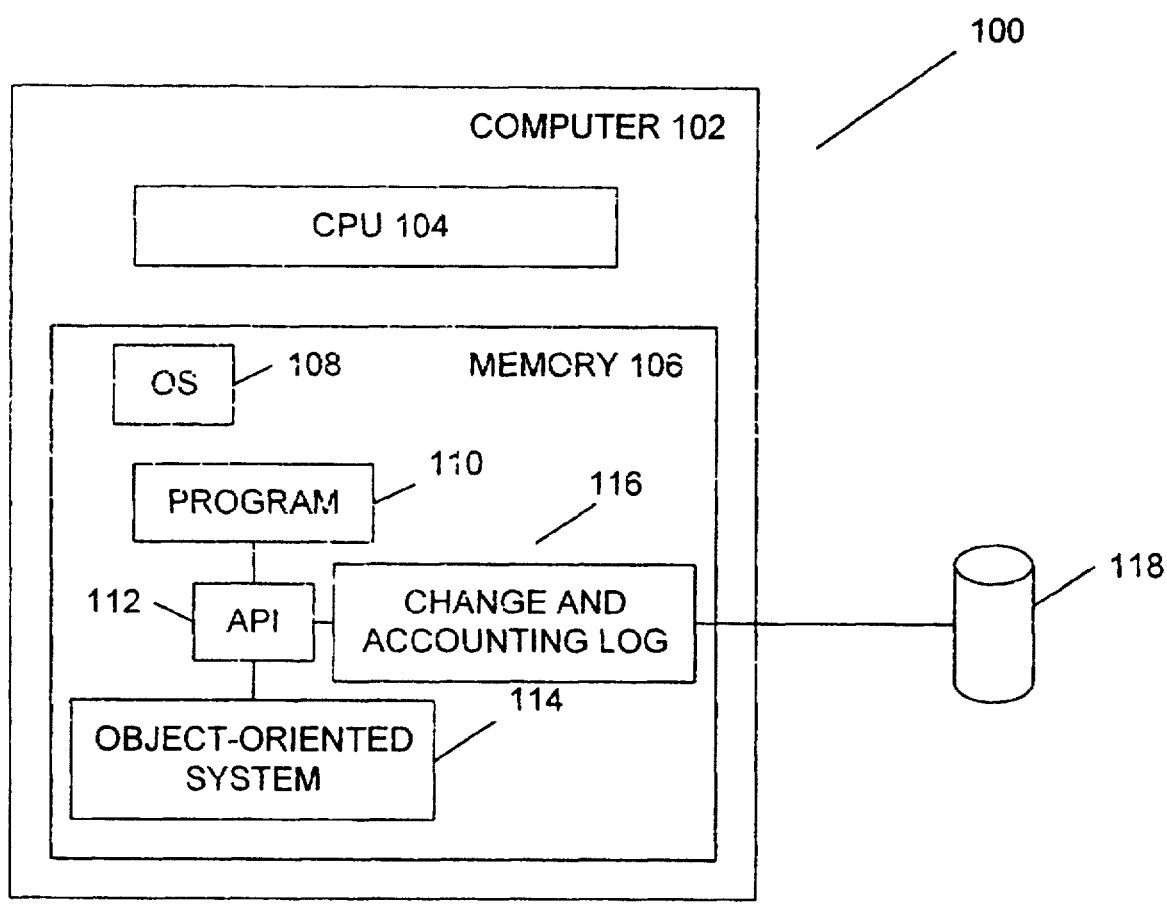
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be coupled to other devices, such as a monitor, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably implemented using one or more object-oriented computer programs or applications 110 and an application programming interface (API) 112 operating under the control of the operating system 108. The computer program 110 accesses and manipulates an object-oriented system 114 stored in the memory 106 of the computer 102 using the functions provided by the API 112. The object-oriented system 114 may include one or more models, which are groupings of classes and objects. As the object-oriented system 114 is changed, the API 112 creates a change and accounting log 116 documenting all such changes made to the object-oriented system 114, for later review or perusal.

In the preferred embodiment, the operating system 108, the computer program 110, the API 112, and the object-oriented system 114 are tangibly embodied in a computer-readable medium, e.g., data storage device 118, which could include one or more fixed or removable data storage devices, such as a zip drive, floppy disc drive, hard drive, CD-ROM drive, tape drive, etc. Further, the operating system 108, the computer program 110, and the API 112 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

Synchronizing the Object-Oriented System

Figure 2:
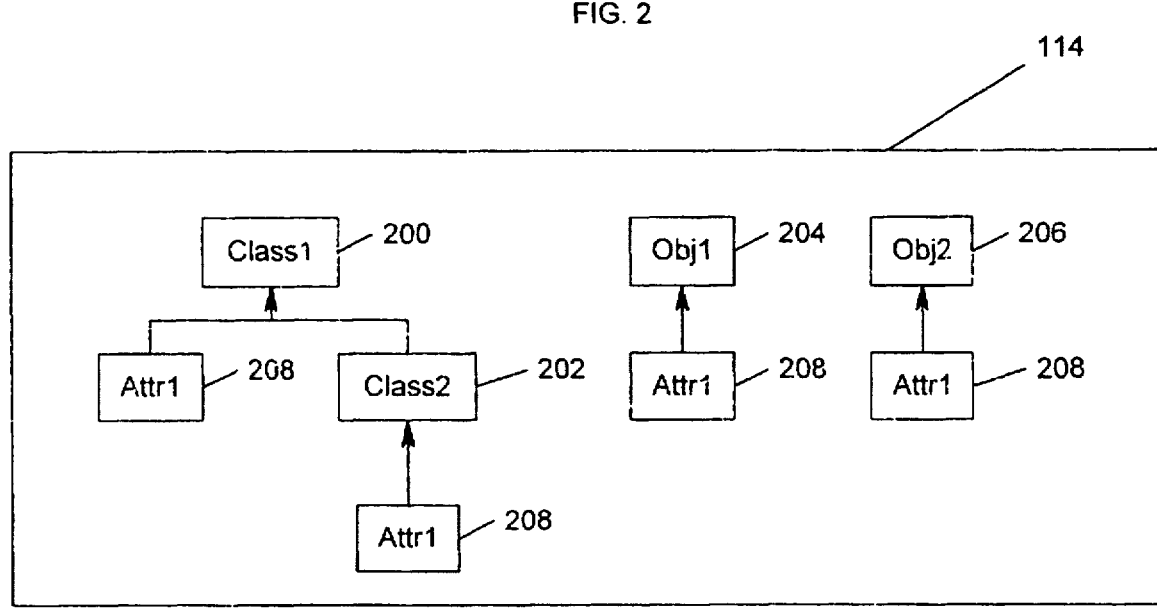
FIG. 2 is a block diagram illustrating the structure of an exemplary object-oriented system according to the present invention.

FIG. 2 is a block diagram illustrating the structure of an exemplary object-oriented system 114 according to the present invention. In the object-oriented system 114, Class2 202 is a subclass of Class1 200. Object1(Obj1) 204 is an instance of Class1 200 and Object2 (Obj2) 206 is an instance of Class2 202.

Class1 200 and Class2 202 both include Attribute1 (Attr1) 208. Attribute1 208 is propagated to Object1 204, which is an instance of Class1 200. Attribute1 208 is also propagated to Object2 206, which is an instance of Class2 202. The attributes are identified as Class1/Attribute1, Class2/Attribute1, Object1/Attribute1, and Object2/Attribute1.

In order to change Attribute1, for example, Class1 200, Object1 204, Class2 202, and Object2 206 must be updated, so that they remain synchronized. The computer program 110, using the API 112, performs this update in three steps: Step 1 generates a list of the classes and objects having the attribute, Step 2 checks all the classes and objects on the list to be sure they can be changed, and Step 3 performs the desired change to the attribute in the listed classes and objects.

In Step 1, the computer program 110 and API 112 determine the targets which will be synchronized by the method. This step traverses the object-oriented system 114 and, using navigation functions, identifies the classes, objects, attributes, etc., for update and records the names of these identified entities in a list.

In Step 2, the computer program 110 proceeds through the list, checking whether the operation would cause local conflicts with each identified class, object, attribute, etc. A user interface optionally queries the user at this step. If all classes, objects, attributes, etc., return an affirmative indication, then the method proceeds to Step 3.

In Step 3, the computer program 110 updates the target classes and objects by calling an API 112 command function for each class and object from the list to change the attribute. After this step, synchronization is complete.

Application Program Interface (API)

The API 112 provides the necessary functions for the computer program 110 to make changes to the classes, objects, attributes, etc., across the object-oriented system 114 as illustrated in FIG. 2. The API 112 also provides the necessary functions for creating a change and accounting log 116 documenting these changes.

API Navigation Functions

The API 112 navigation functions are performed using the following relationships: (1) in a defining entity, from an object to a class and from a subclass to a superclass; (2) in a defined entity, from a class to an object and a superclass to a subclass; (3) in an owner, from a sub-entity to a class or object, where the sub-entity is an attribute, event, etc.; (4) in an owned entity, from a class or object to a sub-entity; and (5) in related attributes, from an attribute to another attribute via a relation.

The following describes some of the specific API 112 navigation functions invoked by the computer program 110.

The function GETDEFININGENTITY identifies the class which is the definition template for an entity. For classes, this function returns the top of the inheritance tree.

The function GETDEFININGCLASS returns the defining class.

The function LISTDEFINEDENTITIES lists the classes in the defining class.

The function LISTDEFINEDENTITIESWITHOBJECT lists the entities in the defining class.

The function LISTSUBCLASSES recursively lists all subclasses of the current class.

The function LISTSUBCLASSESWITHOBJECT lists all subclasses and entities of the current class.

The function LISTINSTANCES lists all instances of the current class. For objects, this function lists all instances of the GETDEFININGENTITY function.

The function LISTINSTANCESRECURSIVELY lists all instances of the current class and its subclasses.

The function GETOWNER returns the object container for objects and sub-entities. For classes, this function returns the superclass. This function returns "self", if at a top-level class or object, or there are no superclasses.

The function LISTOWNEDENTITIES lists all owned entities of the current class.

The function LISTRELATEDENTITIES lists all related entities of the current class.

API Command Functions

The API 112 command functions provide the mechanism for the computer program 110 to modify classes and objects in the object-oriented system 114. The API 112 command functions are a higher level interface that use the API 112 navigation functions. The following describes some of the specific API 112 command functions invoked by the computer program 110 to manipulate the object-oriented system 114.

The GET function retrieves the value of a property of one or more classes, objects, attributes, etc. The input sequence has the name of the class, object, attribute, etc., to get information about, the type of data to retrieve, and the scope of the data.

The CHECK function determines whether an operation should be performed. In essence, the CHECK function allows a user to determine what changes to the object-oriente114 would 114 would occur if an API 112 command function such as SET, ADD, or DELETE were invoked. However, the changes are not actually made to the object-oriented system 114, but are reported through the output parameters. If the user invoked the actual API 112 command function after invoking the CHECK function, the output parameters would be identical, but the object-oriented system 114 would be altered.

The SET function specifies values for properties of classes, objects, attributes, etc. The input sequence has three parameters: the name of the entity to be modified, the property of the entity that is to be modified, and the new value for the property.

The ADD function creates a class, object, attribute, etc., for embedding or connecting to an existing class, object, attribute, etc. The input sequence has the name of the entity, the type of entity to add, the name of the entity to add, and the instance destination.

The DELETE function removes an entity from the object-oriented system 114.

Additional functions provided by the API 112 include instantiation and subclassing. These functions are built on the primary synchronization capabilities, wherein the instantiation function copies classes to objects and the subclassing function adds or removes inherited objects from the superclass.

Implementation of the Computer Program

Figure 3:
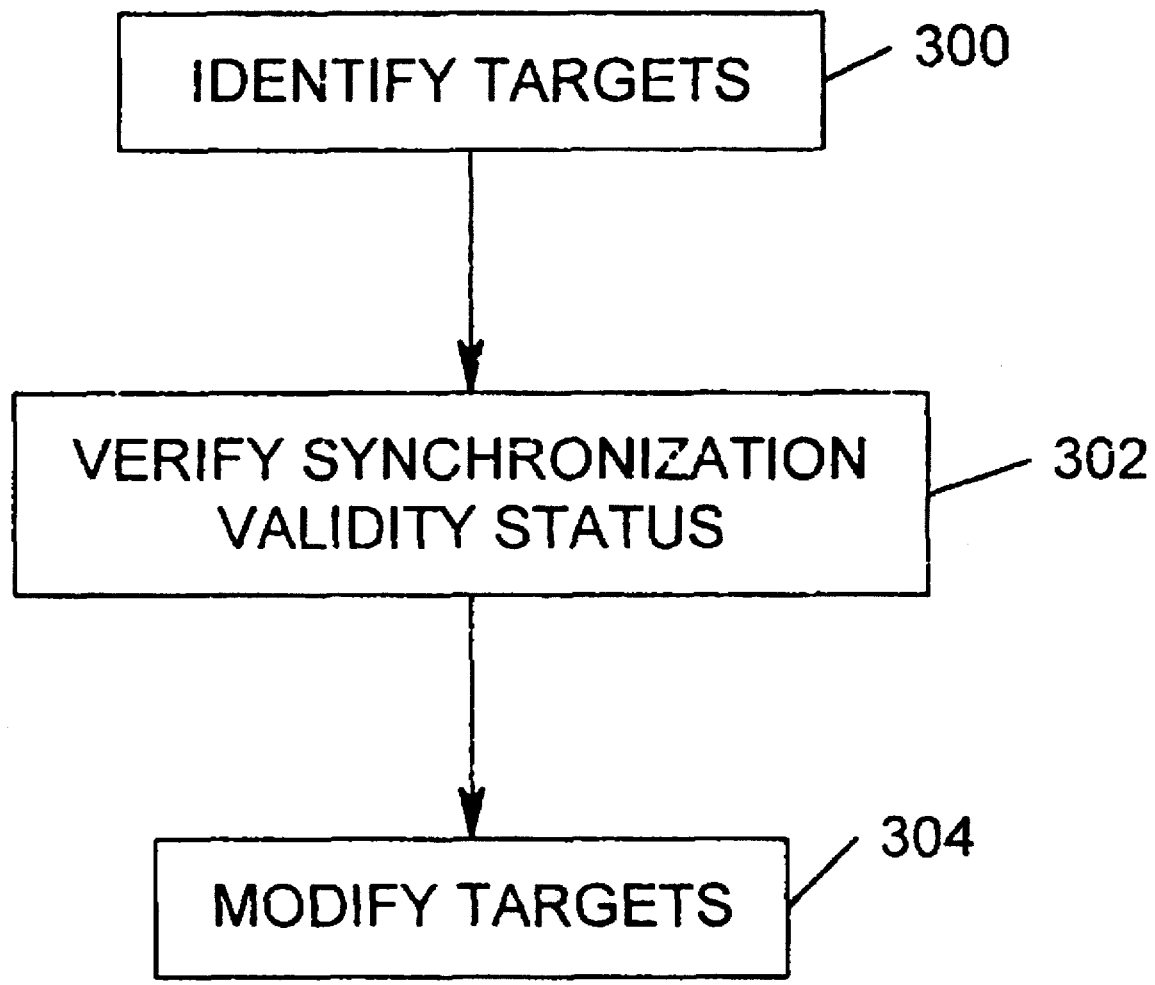
FIG. 3 is a block diagram illustrating the logic of the computer program as performed by the computer according to the present invention.

FIG. 3 is a block diagram illustrating the logic of the computer program 110 as performed by the computer 102 according to the present invention. Block 300 represents the computer 102 traversing the object-oriented system 114 and identifying the classes, objects, attributes, etc., i.e., the targets, to be updated. Block 302 represents the computer 102 checking the list of targets for synchronization validity status, i.e., whether they can be updated. In this step, the computer 102 proceeds through the list of targets and checks each class, object, attribute, etc., to determine whether the operation would cause local conflicts. The user may be asked for confirmation at this step. Block 304 represents the computer 102 performing the actual modifications to the targets, resulting in synchronization.

EXAMPLES

A number of examples are provided below to further illustrate the operation of the present invention. These examples include the API 112 command functions SET, ADD, and DELETE performed on the object-oriented system 114 of FIG. 2.

Update Example

In a first example, suppose the type of Obj1/Attr1 needs to be changed. This requires that all the attributes are updated to a new type so that they remain synchronized. The present invention performs this update in three steps: Step 1 forms a list of the attributes, Step 2 checks all the attributes on the list to be sure they may have their type changed, and Step 3 performs the update on the listed attributes.

Step 1 identifies the objects to change using a series of API 112 navigation functions. The procedure is to find a root defining class, its subclasses, their instances, and then the attribute of the preceding set of classes and objects. The proposed navigation functions called to find the root defining class are:

The API 112 navigation function GETOWNER("Obj1/Attr1") returns "Obj1", the owner of the attribute. The relationship between Attr1 and Obj1 is available as a relative path name "./Attr1" using the GETRELATIVENAME( ) function. The root defining class is then found by the GETDEFININGENTITY("Obj1") function, which returns "Class1" as the top of the inheritance hierarchy.

The subclasses of Class1 are identified by the LISTSUBCLASSES( ) function. The full list of classes and subclasses is ("Class1", "Class2"). For each element, its instances are listed, the net effect being the function LISTINSTANCESRECURSIVELY( ), which returns ("Obj1", "Obj2"). The full set of entities is now ("Class1", "Class2", "Obj1", "Obj2").

The list of target attributes to update are now available by adding the relative path name "./Attr1"to the list above, resulting in ("Class1/Attr1", "Class2/Attr1", "Obj1/Attr1", "Obj2/Attr1"), completing the identification of the entities to update.

Step 2 performs the checking by iterating through the listed targets defined by step 1, and calling the CHECK function on each target from the list. If all objects return an affirmative indication, then the method proceeds to Step 3.

Step 3 updates the target objects by calling the SET function on each target from the list. This completes the synchronization.

Add Example

To add an attribute "Attr2" to Class1 or Obj1, the list of targets is determined in Step 1 ("Class1", "Class2", "Obj1", "Obj2"). The API 112 navigation functions used are GETDEFININGENTITY( ) followed by LISTINSTANCESRECURSIVELY( ).

Step 2 calls the CHECK function for each target of the list from Step 1 to verify the ability to add a new attribute.

Step 3 adds the attribute by invoking the ADD function for each target of the list, thereby completing the synchronization.

Delete Example

To delete the attribute "Attr1" from Class1 or Obj1, the list of targets is determined in Step 1 ("Class1", "Class2", "Obj1", "Obj2"). The API 112 navigation functions used are GETDEFININGENTITY( ) followed by LISTINSTANCESRECURSIVELY( ).

Step 2 calls the CHECK function for each target of the list from Step 1 to verify the ability to delete the attribute.

Step 3 removes the attribute by invoking the DELETE function for each target of the list, thereby completing the synchronization.

Change and Accounting Log Entries

FIGS. 4A–4C are examples of the contents of a change and accounting log 116 created by the present invention. In the present invention, the API 112 records all changes made to the object-oriented system 114 in the change and accounting log 116, including all additions, deletions, and modifications. It also records all requests for information.

Each action made in the object-oriented system 114 may be recorded in the log 116 by the API 112. For example, if a class or attribute is added to, modified in, or deleted from the object-oriented system 114, or an attribute is added to a class, or a change is made to the type of attribute, etc., then the API 112 makes an entry in the log 116 for each action.

FIG. 4A illustrates an entry 402 that is written to the log 116 by the API 112 when "Class1" is added to the object-oriented system 114. The first line includes "APIadd" that identifies that the ADD function in the API 112 was invoked and is a header for the following input parameters. The second, third and fourth lines identify the input parameters passed to the APIadd function, wherein "newModel" on line 2 indicates that the APIadd function is being performed on the model named "newModel", "APIClass" on line 3 indicates that the APIadd function is adding a new class "Class1" to model "newModel", and "Class1" on line 4 indicates that the new class is named "Class1". The fifth line also includes "APIadd" that identifies that the ADD function in the API 112 was invoked and is a header for the following output parameter. The sixth line identifies the output parameter received from the APIadd function, wherein "newModel/Class1" indicates that the APIadd function added a new class to the model. The "rc" on each of lines 2–4 and 6 are return codes from the ADD function (1 means success and 0 means failure).

FIG. 4B illustrates an entry 404 that is written to the log 116 by the API 112 when attribute "a" is added to "Class1" in the object-oriented system 114. The first line includes "APIadd" that identifies that the ADD function in the API 112 was invoked and is a header for the following input parameters. The second, third and fourth lines identify the input parameters passed to the APIadd function, wherein "newModel/Class1" on line 2 indicates that the APIadd function is being performed on class "Class1" in model "newModel", "APIAttribute" on line 3 indicates that the APIadd function is adding a new attribute to class "Class1" in model "newModel", and "a" on line 4 indicates that the new attribute is named "a". The fifth line also includes "APIadd" that identifies that the ADD function in the API 112 was invoked and is a header for the following output parameter. The sixth line identifies the output parameter received from the APIadd function, wherein "newModel/Class1/a" indicates that the APIadd function added a new attribute "a" to class "Class1" of model "newModel". The "rc" on each of lines 2–4 and 6 are return codes from the ADD function (1 means success and 0 means failure).

FIG. 4C illustrates an entry 406 that is written to the log 116 by the API 112 when the type of attribute "a" is set in the object-oriented system 114. The first line includes "APIset" that identifies that the SET function in the API 112 was invoked and is a header for the following input parameters. The second, third and fourth lines identify the input parameters passed to the APIset function, wherein "newModel/Class1/a" on line 2 indicates that the APIset function is being performed on the attribute named "newModel/Class1/a", "APIType" on line 3 indicates that the APIset function is setting the type of the attribute "a" of class "Class1" in the "NewModel" model, and "INTEGER" on line 4 indicates that the attribute "a" is being set to an integer type attribute. The fifth line also includes "APIset" that identifies that the SET function in the API 112 was invoked and is a header for the following output parameter. The sixth line identifies the output parameter received from the APIset function, wherein "newModel/Class1/a" indicates that the APIset function set the type of attribute "a" in class "Class1" of model "newModel". The seventh line also includes "APIset" that identifies that the SET function in the API 112 was invoked and is a header for the following output parameter. The eighth line identifies the output parameter received from the APIset function, wherein "newModel/Class1/a" indicates that the APIset function set the type of attribute "a" in class "Class1" of model "newModel". The "rc" on each of lines 2–4 and 6–8 are return codes from the SET function (1 means success and 0 means failure).

An alternative embodiment of the present invention includes a return code that provides specific error information, such as user id, user name, time, date, and process id in the log.

Change and Accounting Log Flowchart

Figure 5:
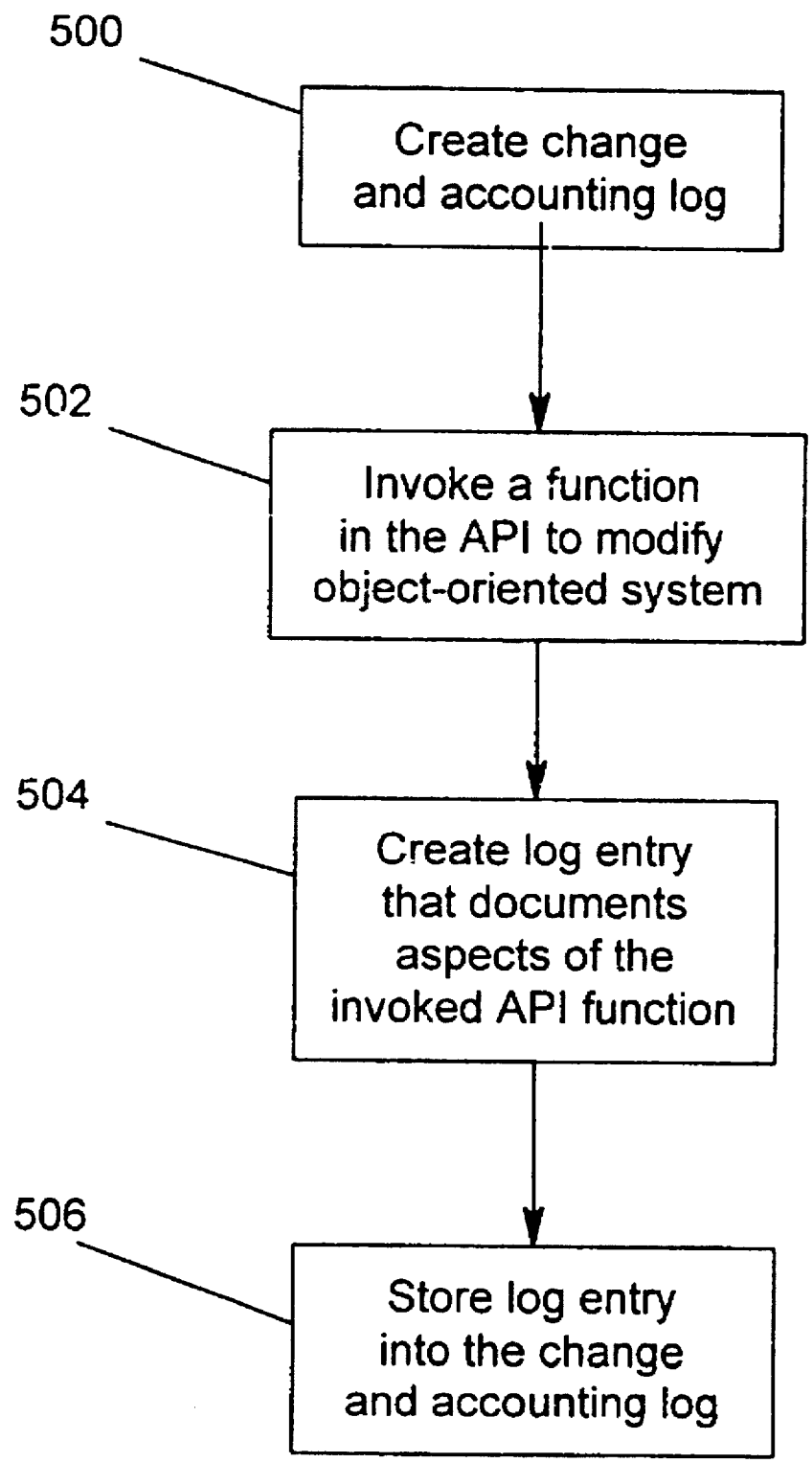
FIG. 5 is a flowchart illustrating the operation of the present invention.

FIG. 5 is a flowchart illustrating the operation of the present invention. Block 500 represents the computer 102 creating a change and accounting log in the data storage device 118 coupled to the computer 102. Block 502 represents the computer 102 invoking a function in the API 112 to modify one or more aspects of an object-oriented system 114. Block 504 represents the computer 102 creating a log entry in the API 112 that documents various aspects of the invoked function, wherein the log entry identifies the invoked function in the API 112, input parameters passed to the invoked function in the API 112, output parameters received from the invoked function in the API 112, and/or a return code received from the invoked function in the API 112 that indicates a successful and failed completion of the invoked function in the API 112. Finally, Block 506 represents the computer 102 storing the log entry into the change and accounting log 116 in the data storage device 118.

Conclusion

This concludes the description of the preferred embodiment of the invention. The present invention discloses a method, apparatus, and article of manufacture for providing a change and accounting log in an object-oriented system. When a function is invoked in an application programming interface (API) to modify one or more aspects of the object-oriented system, a log entry is created in the API that documents various aspects of the invoked function. The log entry identifies the invoked function in the API, input parameters passed to the invoked function in the API, output parameters received from the invoked function in the API, and/or a return code received from the invoked function in the API that indicates a successful and failed completion of the invoked function in the API. Thereafter, the API stores the log entry into the change and accounting log in the data storage device.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for recording modifications to an object oriented system, comprising the steps of:

creating a change and accounting log in a data storage device coupled to a computer, wherein the change and accounting log records all changes to the object oriented system that affect objects in the object oriented system;

invoking a function in an application programming interface to change one or more aspects of an object-oriented system;

creating a log entry in the application programming interface that documents various aspects of the invoked function; and storing the log entry into the change and accounting log in the data storage device.

2. The method of claim 1 above, wherein the log entry identifies the invoked function in the application programming interface.

3. The method of claim 1 above, wherein the log entry identifies input parameters passed to the invoked function in the application programming interface.

4. The method of claim 1 above, wherein the log entry identifies output parameters received from the invoked function in the application programming interface.

5. The method of claim 1 above, wherein the log entry identifies a return code received from the invoked function in the application programming interface.

6. The method of claim 1 above, wherein the return code indicates a successful or failed completion of the invoked function in the application programming interface.

7. The method of claim 1 above, wherein the return code indicates specific error information, including information about a user id, a user name, a time, a date, and a process id in the log.

8. A computerized apparatus for recording modifications to an object oriented system, comprising:

a computer having a data storage device connected thereto;

means, performed by the computer, for creating a change and accounting log in the data storage device coupled to a computer, wherein the change and accounting log records all changes to the object oriented system that affect objects in the object oriented system;

means, performed by the computer, for invoking a function in an application programming interface to change one or more aspects of an object-oriented system;

means, performed by the computer, for creating a log entry in the application programming interface that documents various aspects of the invoked function; and means, performed by the computer, for storing the log entry into the change and accounting log in the data storage device.

9. The apparatus of claim 8 above, wherein the log entry identifies the invoked function in the application programming interface.

10. The apparatus of claim 8 above, wherein the log entry identifies input parameters passed to the invoked function in the application programming interface.

11. The apparatus of claim 8 above, wherein the log entry identifies output parameters received from the invoked function in the application programming interface.

12. The apparatus of claim 8 above, wherein the log entry identifies a return code received from the invoked function in the application programming interface.

13. The apparatus of claim 8 above, wherein the return code indicates a successful and failed completion of the invoked function in the application programming interface.

14. An article of manufacture comprising a program storage medium readable by a computer having a memory, the medium tangibly embodying one or more programs of instructions executable by the computer to perform method steps for recording modifications to an object oriented system, the method comprising the steps of:

creating a change and accounting log in a data storage device coupled to a computer, wherein the change and accounting log records all changes to the object oriented system that affect objects in the object oriented system;

invoking a function in an application programming interface to change one or more aspects of an object-oriented system;

creating a log entry in the application programming interface that documents various aspects of the invoked function; and storing the log entry into the change and accounting log in the data storage device.

15. The method of claim 14 above, wherein the log entry identifies the invoked function in the application programming interface.

16. The method of claim 14 above, wherein the log entry identifies input parameters passed to the invoked function in the application programming interface.

17. The method of claim 14 above, wherein the log entry identifies output parameters received from the invoked function in the application programming interface.

18. The method of claim 14 above, wherein the log entry identifies a return code received from the invoked function in the application programming interface.

19. The method of claim 14 above, wherein the return code indicates a successful and failed completion of the invoked function in the application programming interface.

* * * * *